US009342988B2

(12) United States Patent
Bourret et al.

(10) Patent No.: US 9,342,988 B2
(45) Date of Patent: May 17, 2016

(54) METHOD AND DEVICE FOR DETERMINING A LINEAR TERRAIN PROFILE ALONG A LATERAL APPROACH TRAJECTORY OF AN AIRPORT

(71) Applicant: Airbus Operations (S.A.S.), Toulouse (FR)

(72) Inventors: Thierry Bourret, Toulouse (FR); Kenji Ahualle Horimoto, Sao Paulo (BR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/586,461

(22) Filed: Dec. 30, 2014

(65) Prior Publication Data

US 2015/0317905 A1 Nov. 5, 2015

(30) Foreign Application Priority Data

Jan. 3, 2014 (FR) .................................. 14 50029

(51) Int. Cl.
*G05D 1/00* (2006.01)
*G05D 1/08* (2006.01)
(Continued)

(52) U.S. Cl.
CPC .............. *G08G 5/0086* (2013.01); *G01C 5/005* (2013.01); *G01C 5/06* (2013.01); *G01C 23/00* (2013.01); *G01S 13/882* (2013.01)

(58) Field of Classification Search
CPC . G08G 5/0091; G08G 5/0013; G08G 5/0004; G08G 5/0052; G08G 5/0095; G08G 5/0082; G08G 5/003; G08G 5/0034; G08G 5/006; G08G 5/0065; G01S 13/867; G01S 7/003; G01S 13/765; G01S 13/94; G01S 19/32; G01S 19/20; G01S 15/025; G01S 13/882; G01S 13/913; G01S 19/15; G01S 19/39; G01S 1/02; G01C 21/20; G01C 21/00; G01C 5/005; G01C 5/06; G01C 11/02; G01C 23/005; G01C 21/005; G01C 23/00

USPC ............ 701/14, 120, 4, 8, 116, 15, 300, 411, 701/416, 42, 16, 3, 1, 18, 17, 10, 436; 340/980, 947, 951, 970, 971, 967
See application file for complete search history.

(56) References Cited

U.S. PATENT DOCUMENTS

| | | | | |
|---|---|---|---|---|
| 3,443,073 A | * | 5/1969 | Cohen | ...................... G06G 3/00 244/182 |
| 6,965,816 B2 | * | 11/2005 | Walker | .................... B64C 13/20 244/189 |

(Continued)

FOREIGN PATENT DOCUMENTS

| | | |
|---|---|---|
| GB | 2472497 A | 2/2011 |
| WO | WO-2007/067192 A2 | 6/2007 |

OTHER PUBLICATIONS

French Search Report and Written Opinion for Application No. FR 1450026 dated Nov. 10, 2014.

(Continued)

*Primary Examiner* — Fadey Jabr
*Assistant Examiner* — Luis A Martinez Borrero
(74) *Attorney, Agent, or Firm* — Jenkins, Wilson, Taylor & Hunt, P.A.

(57) ABSTRACT

A device comprising a computation unit for computing, for each of a plurality of different distances relative to a threshold of a landing runway along a lateral approach trajectory, a geometric altitude, using a measured and stored barometric altitude, a computation unit for computing a terrain height, by subtracting, from the computed geometric altitude, a measured and stored height, and a computation unit for determining a terrain profile from the set of terrain heights computed for the set of different distances.

8 Claims, 2 Drawing Sheets

(51) Int. Cl.
  *G05D 3/00* (2006.01)
  *G06F 7/00* (2006.01)
  *G06F 17/00* (2006.01)
  *G08G 5/00* (2006.01)
  *G01S 13/88* (2006.01)
  *G01C 5/00* (2006.01)
  *G01C 5/06* (2006.01)
  *G01C 23/00* (2006.01)

(56) References Cited

U.S. PATENT DOCUMENTS

| | | | | |
|---|---|---|---|---|
| 7,375,678 | B2* | 5/2008 | Feyereisen | G01C 23/00 342/180 |
| 7,554,483 | B2* | 6/2009 | Markiton | G05D 1/0676 342/33 |
| 7,599,766 | B2* | 10/2009 | Ardila | G01C 23/00 701/18 |
| 7,859,448 | B1* | 12/2010 | Woodell | G01S 13/94 342/26 B |
| 7,859,449 | B1* | 12/2010 | Woodell | G01S 13/94 342/26 B |
| 8,019,495 | B2* | 9/2011 | Markiton | G01C 23/00 340/976 |
| 8,112,188 | B2* | 2/2012 | Rouquette | G05D 1/0676 340/947 |
| 8,121,783 | B2* | 2/2012 | Bitar | G01C 23/005 244/181 |
| 8,170,727 | B2* | 5/2012 | Deker | G05D 1/0676 244/180 |
| 8,234,058 | B1* | 7/2012 | Barber | G01C 23/00 701/120 |
| 8,346,412 | B2* | 1/2013 | Lacaze | G01C 23/00 244/187 |
| 8,428,795 | B2* | 4/2013 | Caule | B64C 25/426 340/951 |
| 8,457,872 | B2* | 6/2013 | Deker | G08G 5/045 244/175 |
| 8,489,261 | B2* | 7/2013 | Albert | G05D 1/0676 244/183 |
| 8,494,693 | B2* | 7/2013 | Murphy | G01C 23/00 340/947 |
| 8,718,915 | B1* | 5/2014 | Turcios | G01C 23/005 342/176 |
| 8,781,654 | B2* | 7/2014 | Giovannini | G08G 5/0021 701/1 |
| 8,788,128 | B1* | 7/2014 | McCusker | G08G 5/025 342/120 |
| 9,041,560 | B2* | 5/2015 | Venkataswamy | G08G 5/0013 340/457.1 |
| 9,073,644 | B2* | 7/2015 | Le Gall | B64D 45/04 |
| 9,243,910 | B1* | 1/2016 | Esno | G01C 21/00 |
| 2003/0004641 | A1* | 1/2003 | Corwin | G01S 13/782 701/301 |
| 2003/0093187 | A1* | 5/2003 | Walker | B64C 13/20 701/1 |
| 2003/0132860 | A1* | 7/2003 | Feyereisen | G01C 23/00 340/973 |
| 2003/0222887 | A1* | 12/2003 | Wilkins, Jr. | G01C 23/005 345/618 |
| 2004/0044446 | A1* | 3/2004 | Staggs | G08G 5/025 701/16 |
| 2004/0183698 | A1* | 9/2004 | Rouquette | G05D 1/0676 340/972 |
| 2005/0182530 | A1 | 8/2005 | Murphy | |
| 2005/0187677 | A1* | 8/2005 | Walker | B64C 13/20 701/16 |
| 2006/0224281 | A1* | 10/2006 | Foucart | G01C 23/005 701/16 |
| 2006/0247828 | A1* | 11/2006 | Ardila | G01C 23/00 701/3 |
| 2006/0250280 | A1* | 11/2006 | Chen | G01C 23/00 340/974 |
| 2006/0271249 | A1* | 11/2006 | Testrake | G09B 9/08 701/3 |
| 2007/0106433 | A1* | 5/2007 | He | G01C 23/005 701/16 |
| 2007/0225876 | A1* | 9/2007 | Caillaud | G08G 5/0013 701/16 |
| 2008/0119970 | A1* | 5/2008 | Campbell | G05D 1/0676 701/8 |
| 2008/0150785 | A1* | 6/2008 | Markiton | G05D 1/0676 342/33 |
| 2008/0262665 | A1* | 10/2008 | Coulmeau | G08G 5/0039 701/16 |
| 2008/0300735 | A1* | 12/2008 | He | G01C 23/00 701/3 |
| 2008/0319591 | A1* | 12/2008 | Markiton | G01C 23/00 701/14 |
| 2009/0024261 | A1* | 1/2009 | Rouquette | G05D 1/0676 701/16 |
| 2010/0026525 | A1* | 2/2010 | Feyereisen | G01C 5/005 340/972 |
| 2011/0025530 | A1* | 2/2011 | He | G01C 23/005 340/972 |
| 2011/0035080 | A1* | 2/2011 | Murphy | G05D 1/042 701/9 |
| 2012/0016539 | A1* | 1/2012 | Krishnamurthy | G01C 5/005 701/8 |
| 2013/0238174 | A1* | 9/2013 | Dewas | G05D 1/101 701/16 |
| 2014/0257601 | A1* | 9/2014 | Horne | B64D 45/04 701/16 |
| 2014/0277857 | A1* | 9/2014 | Bourret | G08G 5/0013 701/17 |
| 2014/0354456 | A1* | 12/2014 | Gannon | G08G 5/0047 340/972 |
| 2015/0203214 | A1* | 7/2015 | Bourret | B64C 13/18 701/4 |

OTHER PUBLICATIONS

Uijt De Haag M. et al.: "Flight Test Evaluation of Various Terrain Referenced Navigation Techniques for Aircraft Approach Guidance", Position, Location, and Navigation Symposium, 2006. IEEE/ION Coronado, CA. Apr. 25-27, 2006, Piscataway, NJ, USA, IEEE. pp. 440-442; figures 1-3.

French Search Report and Written Opinion for Application No. FR 1450029 dated Nov. 17, 2014.

\* cited by examiner

METHOD AND DEVICE FOR DETERMINING A LINEAR TERRAIN PROFILE ALONG A LATERAL APPROACH TRAJECTORY OF AN AIRPORT

CROSS-REFERENCE TO RELATED APPLICATION

This application claims priority to French Patent Application No. 14 50029 filed on Jan. 3, 2014, the entire content of which is incorporated by reference herein.

DESCRIPTION

1. Technical Field

The present disclosure relates to a method and a device for determining a linear terrain profile along a lateral approach trajectory of an airport.

2. Background

It is known that aircraft, notably transport airplanes, are generally provided with a terrain database comprising a two-dimensional terrain profile. This terrain profile can be used in different applications, notably in a vertical display to represent the profile of the terrain being flown over.

Generally, the data sources used to construct this type of terrain profile comprise means (optical and/or radar) based on satellites.

The elevation points stored for this terrain profile are meshes of a two-dimensional network with a typical size of 1 Nm (nautical mile) to 0.25 Nm (approximately 460 meters) in proximity to the airports. For each mesh, only the highest point is stored. The relatively large size of the meshes and the content of the data (highest terrain elevation) render its use problematical for certain applications, in particular for the comparison with the measurements of an onboard radio altimeter.

Furthermore, certain applications require a more accurate database, in particular during an approach to a landing runway, for which a very accurate knowledge of the terrain being flown over can prove very useful.

Since the network is two-dimensional, reducing the size of the meshes to low values (typically of the order of 50 meters) requires a significant increase in the storage capabilities of the database, in which such a terrain profile will be stored, and requires the use of appropriate sensors to obtain the required accuracy, which increases the cost in generating the terrain profile, and increases the onboard resources necessary to store this terrain profile.

SUMMARY

An object of the present disclosure is to remedy the drawback of such a two-dimensional terrain profile. It relates to a method for determining a linear terrain profile along a lateral approach trajectory of an airport.

According to the disclosure herein, the method comprises:

a first set of steps, comprising measuring, on at least one aircraft, automatically and repetitively, during at least one flight of the aircraft along the lateral approach trajectory, during an approach to a landing runway of the airport:

using at least one onboard radio altimeter, a height of the aircraft relative to the ground;
  using at least one onboard barometric altimeter, a barometric altitude; and
  using onboard sensors, a total air temperature and a Mach number of the aircraft; and storing these measured values, automatically, in at least one memory; and a second set of steps, implemented after the first set of steps and comprising, automatically, after the flight of the aircraft:

repetitively, for each of a plurality of different distances relative to a threshold of the landing runway along the lateral (or horizontal) approach trajectory:

a) estimating, preferably by linear regression, using the total air temperature, the Mach number and the barometric altitude, measured and stored in the memory, a variation of the static temperature as a function of the altitude and a temperature on the ground;
  b) computing a geometric altitude, using the barometric altitude measured and stored in the memory, as well as the variation of the static temperature and of the temperature on the ground, estimated in step a);
  c) computing a terrain height, by subtracting, from the geometric altitude computed in step b), the height measured by the radio altimeter and stored in the memory; and for the set of the plurality of different distances relative to the threshold of the landing runway along the lateral approach trajectory:

d) determining at least one auxiliary terrain profile from the set of terrain heights computed for the set of different distances; and
  e) determining a terrain profile using at least the auxiliary terrain profile, the terrain profile representing the trend of the terrain height as a function of the distance relative to the threshold of the landing runway, the terrain height being defined relative to a reference altitude corresponding to that of the threshold of the landing runway; and
  f) storing, in a database, the terrain profile determined in step e).

Thus, by virtue of the disclosure herein, a linear terrain profile, that is to say a terrain profile with just one dimension, is determined which extends under and along the lateral approach trajectory. Such a one-dimensional terrain profile notably greatly reduces the volume of data to be stored in the database.

Advantageously, in step b), the geometrical altitude Hft is computed using the following expression:

$$Hft=((Test/(Lest*0.3048))/(1-((T0-(L0 \cdot Hbaro*0.3048))/T0)^{Lest/L0})$$

in which:

Hbaro is the barometric altitude;
Lest is the estimate of the variation of the static temperature, as a function of the altitude;
L0 is a variation of the static temperature, as a function of the altitude of a standard atmosphere model (ISA);
Test is the estimated temperature on the ground; and
T0 is a reference temperature of the standard atmosphere model (ISA).

Moreover, in a simplified first embodiment, in step e), the terrain profile corresponds to the auxiliary terrain profile determined in step d). Furthermore, in a preferred second embodiment, the first set of steps and steps a) to d) of the second set of steps are implemented for a plurality of different approaches so that, for each of this plurality of approaches, an auxiliary terrain profile is determined in step d), and wherein step e) comprising computing, as terrain profile, the average of the auxiliary terrain profiles.

The method for determining a linear terrain profile can further comprise one or more of the following features, taken individually or in combination:

each distance relative to the threshold of the runway is computed by the integration of a so-called reference ground speed of the aircraft, dependent on a ground speed measured and stored during the first set of steps;

an additional step is provided, comprising:
in computing a bias from computations of covariance between determined terrain profiles; and
in adding this bias to the measured ground speed to obtain the reference ground speed, which is integrated;
for each distance considered, the barometric altitude and the height are referenced relative to a reference point located on the aircraft, using a correction using a value of the pitch angle of inclination of the aircraft, measured and stored during the first set of steps, as well as the relative position of the antennas, which is known, because it depends only on the type of aircraft considered.

The present disclosure relates also to a device for determining a linear terrain profile along a lateral approach trajectory of an airport.

According to the disclosure herein, the device is noteworthy in that it comprises:

at least one memory containing values measured on at least one aircraft, during at least one flight of the aircraft along the lateral approach trajectory, during an approach to a landing runway of the airport, namely:
a height of the aircraft relative to the ground, measured using at least one onboard radio altimeter;
a barometric altitude, measured using at least one onboard barometric altimeter; and
a total air temperature and a Mach number, measured using onboard sensors;

a first computation unit configured to estimate, preferably by linear regression, for each of a plurality of different distances relative to a threshold of the landing runway along the lateral approach trajectory, using the total air temperature, the Mach number and the barometric altitude, stored in the memory, a variation of the static temperature as a function of the altitude and a temperature on the ground;

a second computation unit configured to compute, for each of the plurality of distances, a geometric altitude, using the barometric altitude stored in the memory, as well as the variation of the static temperature and of the temperature on the ground, estimated by the first computation unit;

a third computation unit configured to compute, for each of the plurality of distances, a terrain height, by subtracting, from the geometric altitude computed by the second computation unit, the height stored in the memory;

a fourth computation unit configured to determine at least one auxiliary terrain profile from the set of terrain heights computed for the set of different distances;

a fifth computation unit configured to determine a terrain profile using at least the auxiliary terrain profile computed by the fourth computation unit, the terrain profile representing the trend of the terrain height as a function of the distance relative to the threshold of the landing runway, the terrain height being defined relative to a reference altitude corresponding to that of the threshold of the landing runway; and a database, in which is stored the terrain profile determined by the fifth computation unit.

BRIEF DESCRIPTION OF THE DRAWINGS

The figures of the attached drawing will give a good understanding of how the disclosure herein can be produced. In these figures, identical references denote similar elements.

DETAILED DESCRIPTION

Figure 1:
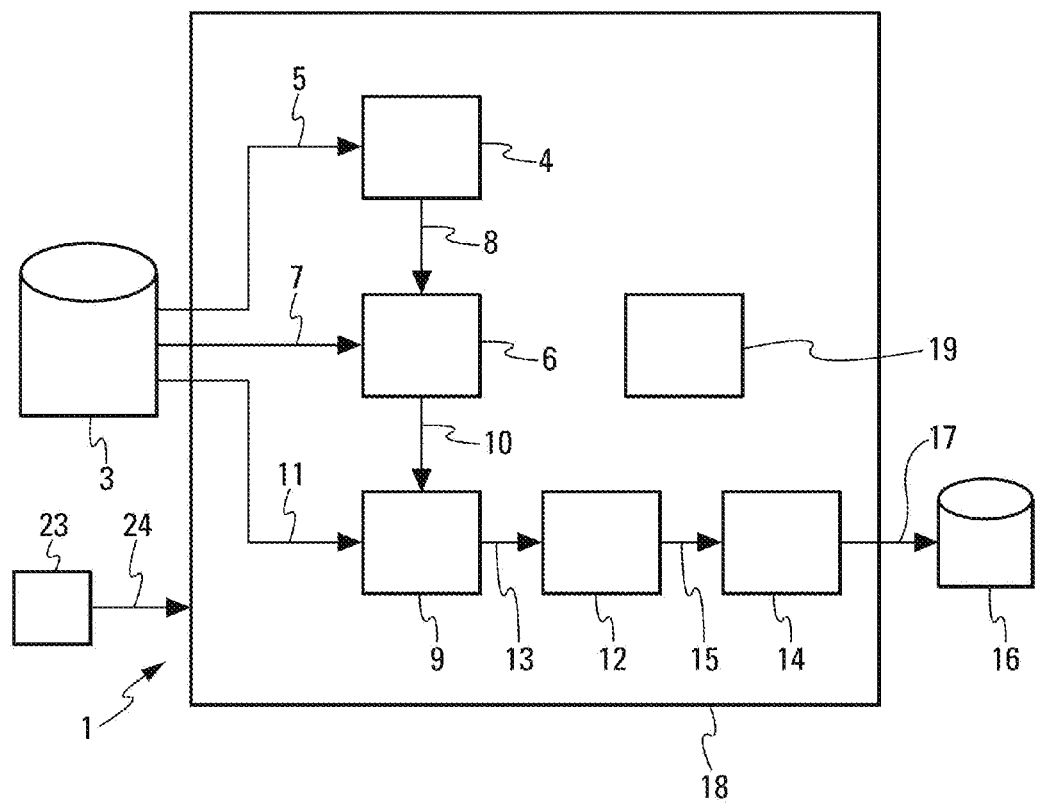
FIG. 1 is the block diagram of a device for determining a linear terrain profile, which illustrates one embodiment of the disclosure herein.
Figure 2:
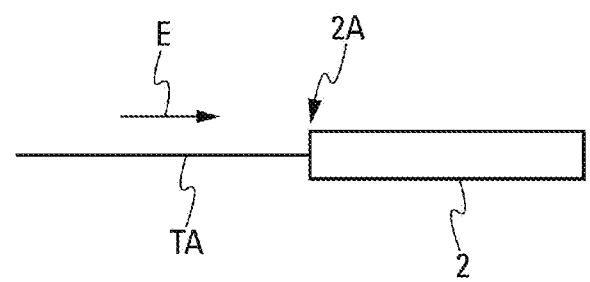
FIG. 2 schematically shows, in plan view, a lateral approach trajectory.

The device 1 schematically represented in FIG. 1 and that makes it possible to illustrate the disclosure herein, is intended to determine a linear terrain profile PT (FIG. 3) along a lateral (or horizontal) approach trajectory TA of a landing runway 2 of an airport, as represented in FIG. 2 (which is a view of the horizontal plane).

Figure 3:
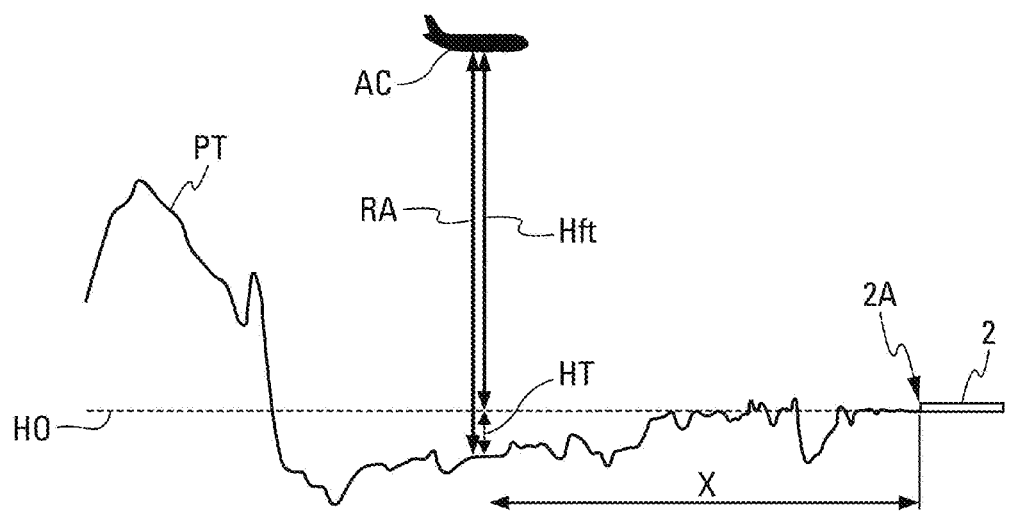
FIG. 3 is a graph that makes it possible to explain the determination of the terrain profile for a particular embodiment of the disclosure herein.

According to the disclosure herein, to do this, the device 1 comprises:

at least one memory 3 containing values measured in the usual way on at least one aircraft, during at least one flight of the aircraft along the lateral approach trajectory TA, during an approach to the landing runway 2 of the airport, namely:
a height RA of the aircraft relative to the ground, measured using at least one onboard radio altimeter;
a barometric altitude Hbaro, measured using at least one onboard barometric altimeter; and
a total air temperature and a Mach number, measured using onboard sensors (total temperature measurement probe, inertial sensor);
a relative position X of the aircraft relative to the threshold of the landing runway 2, measured using at least one GPS system or any other equivalent system. This relative position X can also be determined, notably if it is not stored with the required accuracy, as a function of other stored data (GPS position, position of the threshold of the landing runway 2, ground speed, etc.) using a usual approach such as, for example, an approach such as described below;

a computation unit 4 configured to estimate, for each of a plurality of different distances X relative to a threshold 2A of the landing runway 2 along the lateral approach trajectory TA (that is to say, distances defined in the horizontal plane), using the total air temperature, the Mach number and the barometric altitude, stored in the memory 3 and received via a link 5, a variation of the static temperature Lest dependent on the altitude and a temperature on the ground Test;

a computation unit 6 configured to compute, for each of the plurality of distances X, a geometric altitude Hft, using the barometric altitude Hbaro stored in the memory 3 and received via a link 7, as well as the variation of the static temperature Lest and of the temperature on the ground Test, estimated by the computation unit 4 and received via a link 8;

a computation unit 9 configured to compute, for each of the plurality of distances X, a terrain height HT, by subtracting, from the geometric altitude Hft computed by the computation unit 6 and received via a link 10, the height RA stored in the memory 3 and received via a link 11. Thus, HT=Hft−RA, as represented in FIG. 3;

a computation unit 12 configured to determine at least one auxiliary terrain profile TAaux from the set of the terrain heights HT computed for the set of different distances X by the computation unit 9 and received via a link 13;

a computation unit 14 configured to determine a terrain profile PT using at least the auxiliary terrain profile PTaux computed by the computation unit 12 and received via a link 15. The terrain profile PT represents the trend of the terrain height HT as a function of the distance X relative to the threshold 2A of the landing runway 2. The terrain height PT is defined relative to a reference altitude H0 corresponding to the altitude of the threshold 2A of the landing runway 2 (FIG. 3); and a database 16, in which is stored the terrain profile PT determined by the computation unit 14 and received via a link 17.

From stored flight data, the device 1 therefore constructs a terrain profile PT upstream of the runway 2 (in the direction of flight E of an aircraft in an approach) for a given approach at a given airport. This terrain profile PT is one-dimensional. It is considered that all the aircraft which make the same approach will fly along the same lateral approach trajectory TA.

In a particular embodiment, the computation units 4, 6, 9, 12 and 14 form part of a central processing unit 18.

Consequently, for the implementation of the present disclosure, at least one approach flight, and preferably a plurality of approach flights (for example approximately five flights) are initially performed, during which measurements are made which are stored in flight, then stored on the ground in the memory 3 of the device 1. In a particular embodiment, the memory 3 can contain flight data stored in a recorder of DAR (Direct Access Recorder) type and/or in a recorder of DFDR (Digital Flight Data Recorder) type of a transport airplane that has made the approach along the lateral approach trajectory TA.

Then, in a second stage, the device 1 determines the terrain profile PT using the values measured and stored in the memory 3.

Thus, the present disclosure makes it possible to determine a linear terrain profile PT, that is to say a one-dimensional terrain profile, which extends under and along the lateral approach trajectory TA. Such a one-dimensional terrain profile PT greatly reduces the volume of data to be stored in the database 16.

Furthermore, the linear representation of the terrain profile PT can be defined along any type of lateral approach trajectory TA, in particular a lateral approach trajectory of rectilinear type (as represented in FIG. 2) or a lateral approach trajectory combining one or more combinations of rectilinear or curved sections.

Moreover, the parameters used for the implementation of the disclosure herein (that is to say the parameters measured and stored) are obtained (measured) using usual sensors (radio altimeter, barometric altimeter, total temperature measurement probe, inertial sensor, GPS receiver) on board the commercial airplanes in particular. Thus, it is not necessary to make specific test flights to implement the present disclosure, but it is sufficient to use data stored on commercial airplanes during usual approaches, which reduces the cost of generating the terrain profile PT.

Usually, a radio altimeter is a sensor which measures the distance (or height) of the aircraft AC relative to the ground, namely the distance between the aircraft AC and the point on the ground closest to the aircraft AC in a cone of approximately 30° under the aircraft AC. In particular, a commercial transport airplane is generally equipped with two (or three) radio altimeters.

Furthermore, a barometric altimeter measures the static pressure and determines, from a reference pressure set by the user, the barometric altitude. The reference pressure (at zero height) can be that at sea level, or else that of an airfield. For the present disclosure, the barometric altitude will be recalibrated so that, once on the ground, the altitude of the aircraft AC is zero.

The standard altitude available on board the aircraft AC, which is determined using the barometric altimeter and used for the implementation of the present disclosure, is therefore a barometric altitude Hbaro. This datum is derived from a static pressure measurement Ps and is converted into a barometric altitude Hbaro, using a standard atmospheric model ISA (International Standard Atmosphere) such that:

$$Hbaro=(T0/L0)*(1-(Ps/P0)^{(R*L0/g*M)})/0.3048$$

in which:

T0 is a temperature reference of the standard atmosphere model (ISA), equal to 15° C. at sea level;

L0 is a variation of the static temperature, as a function of the altitude of the standard atmosphere model (ISA);

P0 is a pressure reference, chosen by the crew of the aircraft (and preferably corresponding to the pressure on the ground at the airport level); and R, g and M are predetermined constants: R being the universal constant of the perfect gases, g being the gravitational constant, and M being the molar mass of dry air.

The computation unit 6 computes the geometric altitude Hft from the barometric altitude Hbaro, using the following expression:

$$Hft=((Test/(Lest*0.3048))/(1-((T0-(L0 \cdot Hbaro*0.3048))/T0)^{Lest/L0})$$

in which, in addition to the abovementioned parameters:

Lest is the estimate of the variation of the static temperature as a function of the altitude; and Test is the estimated temperature on the ground.

The parameters Lest and Test are determined by the computation unit 4 as follows.

During the approach, the total air temperature TAT and the Mach number Ma are generally stored. Thus, during the approach, it is possible to compute the static temperature Ts using the following approximate formula:

$$TAT/Ts=1+(\gamma-1)/2*Ma^2$$

in which γ is the ratio of the specific heats.

Having the static temperature Ts during the approach, it is possible to determine Test and Lest by a linear regression, in order to obtain the best possible estimation of Ts by assuming a linear variation as a function of the altitude during the approach.

$$Ts(Hbaro) \approx Test+Lest \times Hbaro$$

To define the altitude Hft of the aircraft AC during an approach, the following steps are implemented:

the barometric altitude Hbaro is recalibrated such that the altitude H0 of the landing runway 2 is zero when the aircraft is on the ground;

the static temperature Ts is computed from the measured temperature TAT and from the Mach number;

the variation of the temperature relative to the altitude (Lest) is estimated and the temperature on the ground (Test) is estimated; and this information is used to determine the altitude Hft of the aircraft AC.

Moreover, in a simplified first embodiment, the computation unit 14 uses simply, as terrain profile PT, the auxiliary terrain profile PTaux, determined by the computation unit 12 for a single approach flight.

Furthermore, in a preferred second embodiment, the measurements are performed for a plurality of N different approach flights (N being an integer number between, for example, 3 and 7) and stored in the memory 3. In this preferred embodiment, a corresponding auxiliary terrain profile PTaux is determined by the computation unit 12 for each of this plurality of approach flights. In this case, the computation unit 14 computes, as terrain profile PT, the average of the N auxiliary terrain profiles PTaux, received from the computation unit 12.

More specifically, for each of the N flights, the computation unit 12 computes an auxiliary terrain profile PTaux in the manner specified above. A dispersion of the results may occur, originating in particular from measurement errors, such as, for example, sensor inaccuracies. Since the points at which the terrain profile is computed are chosen arbitrarily, the flight data used may not be defined in these distances. An interpolation is performed to compute the terrain profile from the closest data, for each of the N flights. Then, at each point, an average is calculated between the N flights so as to obtain the terrain profile PT.

In a particular embodiment, the device 1 constructs a terrain profile PT from 12 000 meters at X (which represents an altitude of approximately 2000 feet) upstream (in the direction E of flight during the approach) of the threshold 2A of the runway 2 (FIG. 2). Efforts are made to minimize the size of the database 16 used (in particular an onboard database) to store the terrain profile PT, that is to say the number of points of the terrain profile PT.

The stored position (GPS) of the aircraft AC can be stored at a low sampling rate (for example 4 seconds) and/or with a low resolution (for example 76 meters), i.e. too low to obtain a sufficient accuracy of the terrain profile PT. Provision is therefore made, in a particular embodiment, to determine the distance X to the threshold 2A of the runway 2 without using the absolute position of the aircraft.

To determine the distance from the aircraft AC to the threshold 2A of the runway 2, a temporal integration of the ground speed V1 makes it possible to determine the distance X as a function of time t:

$$X(t) = \int_0^t V1(\tau)d\tau$$

The integration is initialized above the threshold 2A of the runway (the radio altimeter then being located at 50 feet for standard runways).

However, this method can deliver a divergent error because the measured ground speed V1 may be affected by a constant bias k. The real ground speed V2 can be determined if the bias k is known:

$$V2 = V1 + k$$

This real ground speed V2, when determined, can be used in the integration. Each distance X relative to the threshold 2A of the runway 2 is then computed by the integration of the ground speed V2 of the aircraft, dependent on the ground speed V1 measured and stored during an approach flight.

To resolve the abovementioned problem, the data from a plurality of approach flights are used, and, for each flight, the bias k affecting each approach is estimated, which minimizes the dispersion between the terrain profiles computed for each approach. The technique used is based on a computation of covariance between the terrain profiles computed by pairs of approaches. Since the data used relate to a single dimension, the computation method remains relatively simple and can be automated.

The covariance technique provides an accurate determination of the bias when the terrain profile varies a lot. On the other hand, it is less so for a flat terrain. However, in this case, the influence of the bias is negligible. A limited number of approaches (approximately 5) is sufficient to perform an accurate computation.

Moreover, in a preferred embodiment, the position of the aircraft AC is stored with a suitable sampling rate and a sufficient resolution such that it is not necessary to implement the preceding computations to determine a bias. The distance X is determined (using a usual approach 23 which is, for example, linked by a link 24 to the unit 18) by computing, at each instant, the distance of the aircraft relative to the position of the threshold of the landing runway 2, which can be known by consulting the airport installation data published by the states.

Figure 4:
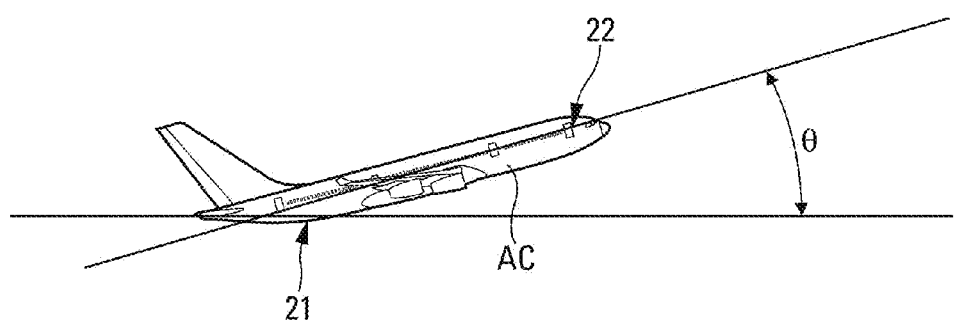
FIG. 4 shows the location on an aircraft of sensors used for the implementation of the disclosure herein.

Moreover, on an aircraft AC corresponding to a transport airplane, the antenna or antennas of the radio altimeter or radio altimeters is/are arranged toward the rear and at the bottom of the aircraft AC as indicated by an arrow 21 in FIG. 4 and the barometric altimeters (pressure probes) are arranged toward the front, as indicated by an arrow 22 in FIG. 4. Consequently, a height offset appears between the two measurement zones, an offset which is a function of the pitch angle of inclination $\theta$ of the aircraft AC and of the relative positions of the respective sensors.

Also, to correct this offset, for each distance considered, the barometric altitude determined by the barometric altimeter and the height measured by the radio altimeter are referenced relative to one and the same reference point located on the aircraft AC, using a geometric correction using the current value (at the distance considered) of the pitch angle of inclination $\theta$ of the aircraft, which has been measured and stored during the approach flight and the known relative positions of the respective sensors. To do this, the device 1 comprises a computation unit 19 which references the measurements produced relative to this reference point located on the aircraft AC. This reference point can be the center of gravity of the aircraft AC, the lowest point of the wheels of the landing gear, the position of the pilot, the position of an ILS antenna or any other point of the aircraft AC.

The terrain profile PT is defined, preferably, for a minimum of data, namely for a minimum of distance values relative to the threshold 2A of the landing runway 2, in order to minimize the size of the database 16. In practice, 150 points (of altitude) are sufficient to provide an accurate terrain profile PT, for altitudes ranging from 2000 feet to the threshold 2A of the landing runway 2.

The present disclosure makes it possible to generate a terrain profile PT by using data obtained from standard flights, that is to say commercial flights of airlines. Even if the data originating from in-flight tests are more accurate, the standard flight data are of significant economic interest, because it is fairly easy to recover them and use them, most of the airlines having in place a program of systematic analysis of all the flights within the framework of flight safety monitoring. For the implementation of the disclosure herein, it is thus possible to use flight data recorded in a recorder of DAR (Direct Access Recorder) type and/or a recorder of DFDR (Digital Flight Data Recorder) type.

The terrain profile PT (FIG. 3) determined by the device 1 can be used in very many applications, and notably:
on board an aircraft AC:
to assist in the vertical guiding of the aircraft AC in an approach to a landing runway 2;
to produce a vertical terrain profile display;

to be used as reference in the monitoring of radio altimeters to be able to detect failures;

to determine the height of the aircraft AC relative to the threshold of the landing runway 2 in order to initiate the flare in an appropriate manner even if the aircraft AC is not over the threshold of the landing runway 2, notably if the profile before the threshold is not flat, which can occur when the aircraft AC is heavy and/or has a high approach speed;

on the ground:

to validate two-dimensional terrain profiles and thus increase the integrity thereof;

to improve the accuracy of two-dimensional terrain profiles; and to recompute the relative position of the aircraft relative to a runway from lower quality stored data.

The invention claimed is:

1. A method for determining a linear terrain profile along a lateral approach trajectory of an airport, the method comprising:

at a central processing unit (CPU) that is communicatively linked to a database and at least one memory:

receiving measured values that are automatically stored in the at least one memory, wherein the measured values are automatically and repetitively measured on at least one aircraft during at least one flight of the aircraft along the lateral approach trajectory, during an approach to a landing runway of the airport, and wherein the measured values comprise a height of the aircraft relative to the ground measured using at least one onboard radio altimeter, a barometric altitude measured using at least one onboard barometric altimeter, a total air temperature and a Mach number of the aircraft measured using onboard sensors;

automatically, after the flight of the aircraft and after receiving the measured values:

repetitively, for each of a plurality of different distances relative to a threshold of the landing runway along the lateral approach trajectory:

a) estimating, using the total air temperature, the Mach number and the barometric altitude, measured and stored in the at least one memory, a variation of the static temperature dependent on the altitude and a temperature on the ground;

b) computing a geometric altitude, using the barometric altitude measured and stored in the at least one memory, as well as the variation of the static temperature and of the temperature on the ground, estimated in step a);

c) computing a terrain height, by subtracting, from the geometric altitude computed in step b), the height measured by the radio altimeter and stored in the at least one memory; and for the set of the plurality of different distances relative to the threshold of the landing runway along the lateral approach trajectory:

d) determining at least one auxiliary terrain profile from the set of terrain heights computed for the set of different distances;

e) determining a one-dimensional terrain profile using at least the auxiliary terrain profile, the terrain profile representing the trend of the terrain height as a function of the distance relative to the threshold of the landing runway, the terrain height being defined relative to a reference altitude corresponding to that of the threshold of the landing runway; and f) storing, in the database, the terrain profile determined in step e).

2. The method of claim 1, wherein, in step b), the geometric altitude is computed using the following expression:

$$\text{geometric altitude} = Hft = ((Test/(Lest*0.3048))/(1-((T0-(L0 \cdot Hbaro*0.3048))/T0)^{Lest/L0})$$

in which:

geometric altitude is Hft;

Hbaro is the barometric altitude;

Lest is the estimate of the variation of the static temperature, as a function of the altitude;

L0 is a variation of the static temperature, as a function of the altitude of a standard atmosphere model;

Test is the estimated temperature on the ground; and

T0 is a reference temperature of the standard atmosphere model.

3. The method of claim 1, wherein each distance relative to the threshold of the runway is computed by the integration of a reference ground speed of the aircraft, dependent on a ground speed received and automatically stored in the at least one memory.

4. The method as claimed in claim 3, further comprising:

computing a bias from computations of covariance between determined terrain profiles; and adding this bias to the measured ground speed to obtain the reference ground speed, which is integrated.

5. The method of claim 1, wherein, in step e), the terrain profile corresponds to the auxiliary terrain profile determined in step d).

6. The method of claim 1, wherein measuring the values received in the receiving step and steps a) to d) are implemented for a plurality of different approaches so that, for each of the plurality of approaches, an auxiliary terrain profile is determined in step d), and wherein step e) comprises computing, as a terrain profile, an average of the auxiliary terrain profiles.

7. The method of claim 1, wherein, for each distance considered, the barometric altitude and the height are referenced relative to a reference point located on the aircraft, using a correction including a measured and stored value of the pitch angle of inclination of the aircraft received at the CPU, and relative positions of the antennas.

8. A device for determining a linear terrain profile along a lateral approach trajectory of an aircraft, the device comprising:

at least one memory containing values measured on at least one aircraft, during at least one flight of the aircraft along the lateral approach trajectory, during an approach to a landing runway of the airport, the measured values comprising:

a height of the aircraft relative to the ground, measured using at least one onboard radio altimeter;

a barometric altitude, measured using at least one onboard barometric altimeter; and a total air temperature and a Mach number, measured using onboard sensors;

a first computation unit configured to estimate, for each of a plurality of different distances relative to a threshold of the landing runway along the lateral approach trajectory, using the total air temperature and the Mach number, stored in the at least one memory, a variation of the static temperature dependent on the altitude and a temperature on the ground;

a second computation unit configured to compute, for each of the plurality of different distances, a geometric altitude, using the barometric altitude stored in the at least one memory, as well as the variation of the static temperature and of the temperature on the ground, estimated by the first computation unit;
a third computation unit configured to compute, for each of the plurality of different distances, a terrain height, by subtracting, from the geometric altitude computed by the second computation unit, the height stored in the at least one memory;
a fourth computation unit configured to determine at least one auxiliary terrain profile from the set of the terrain heights computed for the set of different distances;
a fifth computation unit configured to determine a one-dimensional terrain profile using at least the auxiliary terrain profile computed by the fourth computation unit, the terrain profile representing the trend of the terrain height as a function of the distance relative to the threshold of the landing runway, the terrain height being defined relative to a reference altitude corresponding to that of the threshold of the landing runway; and
a database configured to store the terrain profile determined by the fifth computation unit.

* * * * *